United States Patent [19]

Guinn

[11] Patent Number: 4,932,795
[45] Date of Patent: Jun. 12, 1990

[54] ELECTRICALLY CONDUCTIVE PLASTIC BUSHINGS FOR MARINE PROPULSION DEVICES

[75] Inventor: Douglas B. Guinn, Whitefish Bay, Wis.

[73] Assignee: Outboard Marine Corporation, Waukegan, Ill.

[21] Appl. No.: 270,767

[22] Filed: Nov. 10, 1988

[51] Int. Cl.⁵ .................................... F16C 17/14
[52] U.S. Cl. ........................... 384/276; 384/97; 384/297; 384/624; 440/61
[58] Field of Search ............... 384/910, 276, 277, 9, 384/476, 492, 624, 297, 300, 296, 907.1, 912, 97; 440/53, 900, 61; 416/247 B

[56] References Cited

U.S. PATENT DOCUMENTS

| | | | |
|---|---|---|---|
| 1,464,569 | 4/1922 | Guptill | 428/545 |
| 2,477,139 | 4/1944 | Patton | 384/912 |
| 2,691,814 | 11/1952 | Tait | 164/110 |
| 3,053,593 | 9/1962 | Blair et al. | 384/300 |
| 3,169,504 | 12/1963 | Gruber | 440/49 |
| 3,330,751 | 7/1967 | Warner | 204/196 |
| 3,924,825 | 12/1975 | Peschke | 384/313 |
| 4,077,742 | 3/1978 | Goodwin | 416/244 |
| 4,109,978 | 8/1978 | Ernst et al. | 384/277 |
| 4,308,801 | 1/1982 | Cooper et al. | 384/422 |
| 4,391,567 | 7/1983 | Ciampolillo | 416/146 R |
| 4,406,632 | 9/1983 | Blanchard | 440/61 |
| 4,406,634 | 9/1983 | Blanchard | 440/61 |
| 4,504,237 | 3/1985 | Blanchard | 440/61 |
| 4,549,949 | 10/1985 | Guinn | 204/197 |
| 4,758,101 | 7/1988 | Rolf, Sr. et al. | 384/428 |
| 4,767,225 | 8/1988 | Iio | 384/626 |
| 4,798,771 | 1/1989 | Vogel | 384/912 |

Primary Examiner—Thomas R. Hannon
Attorney, Agent, or Firm—Michael, Best & Friedrich

[57] ABSTRACT

A marine propulsion device is provided including a propulsion unit adapted to be mounted on a boat for pivotal movement relative thereto about a generally vertical steering axis, the propulsion unit having a propeller shaft supporting a propeller, an internal combustion engine drivingly connected to the propeller, and a corrosion protection system, which device also includes at least one bushing made of a conductive plastic to allow a path for electrical connection to the corrosion protection system to be established across the bushing.

23 Claims, 1 Drawing Sheet

"4,932,795"

ELECTRICALLY CONDUCTIVE PLASTIC BUSHINGS FOR MARINE PROPULSION DEVICES

BACKGROUND OF THE INVENTION

The invention relates to marine propulsion devices, and more particularly to corrosion protection systems for use in marine propulsion devices.

In marine propulsion devices, it is common to have a corrosion protection system, such as a cathodic protection system, wherein an electrical current path is provided between the various metallic components of the propulsion system, and a sacrificial anode is included in the circuit. The sacrificial anode is made of a less noble metal than the other metallic components of the propulsion system, so that the sacrificial anode will corrode before corrosion of the other metallic components in the circuit. Typically, sacrificial anodes in marine propulsion devices are made of zinc, while the other metallic components of the marine propulsion device are usually aluminum or stainless steel. See Guinn U.S. Pat. No. 4,549,949, issued Oct. 29, 1985, for a description of a cathodic protection system. Other corrosion protection systems, such as anodic protection systems, also require electrical current paths between the various metallic components of the propulsion system.

Bushings, generally made of non-conductive materials such as plastic, acetel, nylon etc. are used throughout marine propulsion devices as bearing surfaces. Materials of this sort are used to provide bushings that are lightweight, non-corrodible, and relatively inexpensive. For example, in marine propulsion devices such as outboard motors or stern drive motors, a specific use for the bushings would be as pivot bushings for hydraulic cylinder assemblies which effect steering or tilting movement of the propulsion device relative to a boat to which the propulsion device is attached. The materials commonly used to make these bushings are usually of high resistivity, and thus severely impede the corrosion protective current of the corrosion protection system from flowing through the bushing. Unsightly and expensive ground wires are required to electrically connect components of the marine propulsion device that would otherwise be electrically insulated from the corrosion protection system by the non-conductive bushings.

While the prior art provides impregnated and coated bearings, such as those disclosed in Guptill U.S. Pat. No. 1,464,569, issued Aug. 14, 1923, or in Tait U.S. Pat. No. 2,691,014, issued October 19, 1954, neither of these patents discuss the desirability of eliminating ground wires which connect components of marine propulsion devices otherwise electrically insulated by bushings, such as pivot bushings, made of highly resistive materials. Plastic bushings adapted to be electrically conductive are not disclosed in the prior art.

SUMMARY OF THE INVENTION

The invention provides a bushing for use in a marine propulsion device having a corrosion protection system requiring electrical current flow, said bushing being comprised of plastic which is at least partially coated or plated with a conductive material to provide a path for current flow across the bushing.

In one embodiment of the invention, a marine propulsion device is provided including a corrosion protection system, a hinge pin, a first electrically conductive component connected to the hinge pin, a second electrically conductive component mounted on the hinge pin for rotation relative to the first electrically conductive component, at least one bushing on the hinge pin separating the first electrically conductive component from the second electrically conductive component, which bushing comprises electrically conductive plastic.

In one embodiment of the invention, a marine propulsion device is provided comprising a propulsion unit adapted to be mounted on a boat for pivotal movement relative thereto about a generally vertical steering axis, the propulsion unit including a propeller shaft adapted to support a propeller and adapted to be driven by an engine, the marine propulsion device further including a corrosion protection system requiring electrical current flow at at least one bushing made of a conductive plastic permitting current flow thereacross between electrically conductive components separated thereby.

In one embodiment of the invention, a pivot bushing is provided for a hydraulic tilt/trim cylinder of a stern drive or outboard motor having a corrosion protection system requiring current flow, which bushing comprises a conductive plastic to provide a path for current flow across the bushing.

In one embodiment of the invention, a bushing is provided for use in a marine propulsion system having a cathodic protection system, which bushing comprises a conductive plastic allowing electrical current flow across the bushing to a sacrificial anode.

In one embodiment of the invention, a bushing is provided for use in a marine propulsion system having an anodic protection system, which bushing comprises a conductive plastic to provide an electrical current path across the bushing.

Other features and advantages of the invention will become apparent to those skilled in the art upon review of the following detailed description of the preferred embodiment, claims and drawings.

Figure 1:
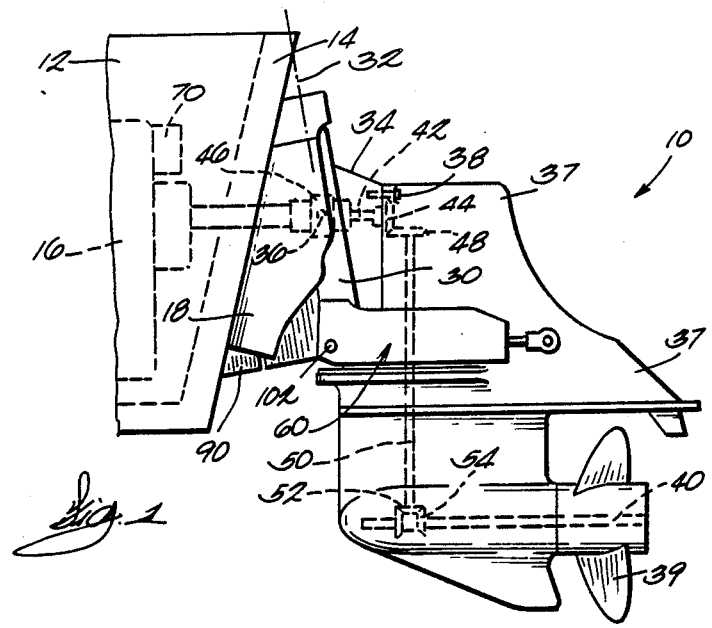
FIG. 1 is a side elevational view of a marine propulsion device embodying the invention.

Before one embodiment of the invention is explained in detail, it is to be understood that the invention is not limited in its application to the details of construction and the arrangement of components set forth in the following description, or as illustrated in the drawings. The invention is capable of other embodiments and of being practiced or carried out in various ways. Also, it is to be understood that the phraseology and terminology used herein is for the purpose of description and should not be regarded as limiting.

DESCRIPTION OF THE PREFERRED EMBODIMENT

Illustrated in the drawings is a marine propulsion device 10 mounted on a boat 12 having a transom 14. In the preferred embodiment, the marine propulsion device 10 is of the stern drive or inboard/outboard type. However, the invention can be embodied in other types of marine propulsion devices, such as in outboard motors. Furthermore, while the marine propulsion device of the preferred embodiment includes a hydraulic assembly for tilting the propulsion unit, it should be understood that the invention is applicable to hydraulic assemblies for steering the propulsion unit.

As best shown in FIG. 1, the marine propulsion device 10 comprises an engine 16 securely mounted on the boat 12 by suitable means such as rubber mounts (not shown). The marine propulsion device 10 also comprises a mounting bracket or gimbal housing 18 mounted on the outer surface of the boat transom 14 and fixedly attached to the boat transom 14. The gimbal housing 18 can be attached to the boat transom 14 by any suitable means, such as by bolts extending through the transom 14.

The marine propulsion device 10 also comprises a gimbal ring 30 connected to the gimbal housing 18 for pivotal movement relative to the gimbal housing 18 about a generally vertical steering axis 32, and a pivot housing 34 connected to the gimbal ring 30 for pivotal movement relative to the gimbal ring 30 about a generally horizontal tilt axis 36. Such a construction is well known in the art and will not be described in detail other than as necessary for an understanding of the invention. In the illustrated construction, the gimbal ring 30 includes spaced apart generally vertical side members, and a lower end, and the gimbal ring 30 is partially covered by the side members of the gimbal housing 18.

The marine propulsion device 10 also comprises a propulsion unit 37 removably connected to the pivot housing 34 for common pivotal movement of the propulsion unit 37 with the pivot housing 34. In the illustrated construction, the propulsion unit 37 is removably connected to the pivot housing 34 by a plurality of bolts 38. The propulsion unit 37 includes a propeller shaft 40 adapted to support a propeller 39 and a generally horizontal drive shaft 42 having one end removably connected to the engine 16 and an opposite end having thereon a bevel gear 44. A universal joint 46 attached to the horizontal drive shaft 42 allows pivotal movement of the drive shaft 42 with the propulsion unit 37. The bevel gear 44 drives a bevel gear 48 on the upper end of a vertical drive shaft 50. The lower end of the vertical drive shaft 50 has thereon a driving gear 52. A reversible transmission selectively clutches a pair of driven gears 54 to the propeller shaft 40 to transmit forward or reverse motion to the propeller shaft 40 from the driving gear 52.

The marine propulsion device 10 also comprises a pair of hydraulic cylinder/piston assemblies 60 pivotally connected between the gimbal housing 18 and the propulsion unit 37 for effecting pivotal movement (tilt and trim movement) of the propulsion unit 37 relative to the gimbal housing 18 and relative to the gimbal ring 30 about the tilt axis. In the preferred embodiment, the hydraulic cylinder/piston assemblies 60 are connected between the lower end of the gimbal ring 30 and the propulsion unit 37. The cylinder/piston assemblies 60 extend on opposite sides of the propulsion unit 37. Only one cylinder/piston assembly 60 is shown in FIG. 1. While other corrosion protection systems could be used, a cathodic protection system is used in the preferred embodiment of the invention. The sacrificial anode of the cathodic protection system is indicated by the numeral 90.

Figure 2:
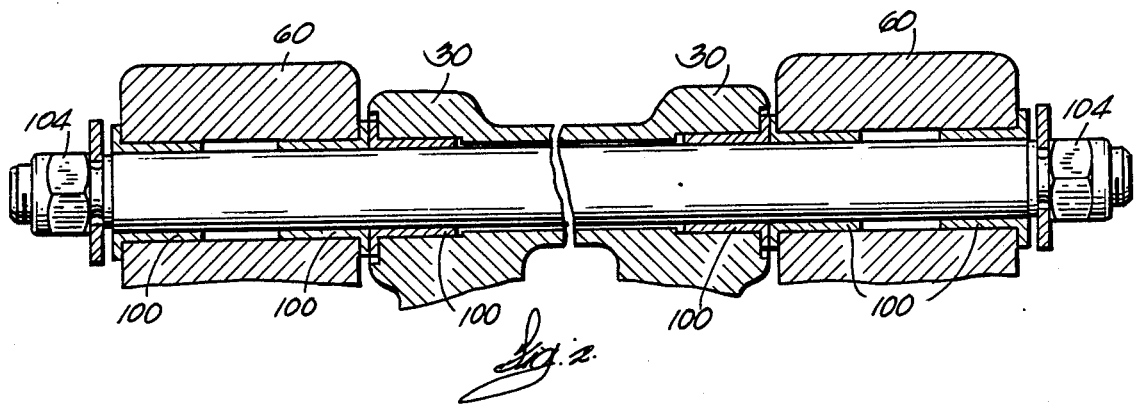
FIG. 2 is a horizontal cross section of the gimbal ring and cylinder assemblies.

FIG. 2 is a cross-sectional view showing the gimbal ring and cylinder/piston assemblies. The cylinder/piston assemblies 60 are rotatably fastened to the gimbal ring 30 by a pivot pin 102 and fastening means 104. Bushings 100 allow for smooth rotation and reduced friction between the major components shown in FIG. 2. Bushings 100 are generally plastic for low cost and weight. The bushings 100 are not, of course, limited to use at the locations shown in FIG. 2, but could be used wherever a bearing surface is required in the propulsion unit.

Figure 3:
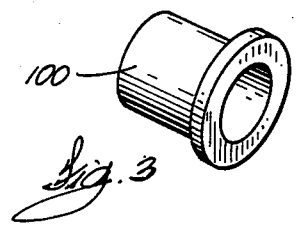
FIG. 3 is a perspective view of a bushing of the preferred embodiment of the invention.

FIG. 3 is a perspective view of one of the bushings 100 shown in FIG. 2. The bushing 100 is made to have a sufficiently low resistivity so as to allow current to flow, even if two bushings 100 are placed side-by-side, forming an electrical series resistance, as shown in FIG. 2. The maximum resistivity of the bushing of the preferred embodiment is 100 ohm-centimeters, which is well within the practical resistivity limits of conductive plastics. Of course the maximum resistivity allowable for a particular bushing will depend on its location in the marine propulsion device, and the design of the corrosion protection system used, as will be apparent to those of ordinary skill in the art.

The bushings 100 of the preferred embodiment are manufactured from conductive plastics. The plastic bushing's resistivity is greatly reduced by adding filler materials to it such as carbon, aluminum or stainless steel, as it known in the art.

In an alternate embodiment, portions of the plastic bushing are coated or plated with a conductive material.

Various of the features of the invention are set forth in the following claims.

I claim:

1. A marine propulsion device comprising a propulsion unit adapted to be mounted on a boat for pivotal movement relative thereto about a generally vertical steering axis, said propulsion unit including a propeller shaft adapted to support a propeller and adapted to be driven by an engine, said marine propulsion device further including a corrosion protection system requiring electrical current flow and at least one bushing made of a conductive plastic permitting current flow thereacross between electrically conductive components separated thereby.

2. A marine propulsion device is accordance with claim 1 wherein said bushing comprises filler material selected from the group carbon, aluminum, or stainless steel.

3. A marine propulsion device in accordance with claim 1 wherein said bushing has a resistivity less than 100 ohm-centimeters.

4. A bushing for use in a marine propulsion device having a corrosion protection system requiring electrical current flow, said bushing being comprised of plastic which is at least partially coated or plated with a conductive material to provide a path for current flow across said bushing.

5. A bushing in accordance with claim 4 wherein said conductive material is selected from the group carbon, aluminum, or stainless steel.

6. A pivot bushing for a hydraulic tilt/trim cylinder of a stern drive or outboard motor having a corrosion protection system requiring current flow, which bushing comprises a generally hollow cylindrical flange portion having a circular periphery of a predetermined diameter, and a generally hollow cylindrical sleeve portion which is coaxial with said flange portion and which has a circular periphery of a diameter which is less than the predetermined diameter, said bushing being formed of a conductive plastic to provide a path for current flow across said bushing.

7. A pivot bushing in accordance with claim 6 wherein said conductive plastic is comprised of filler material selected from the group carbon, aluminum, or stainless steel.

8. A pivot bushing in accordance with claim 6 having a resistivity less than 100 ohm-centimeters.

9. A bushing for use in a marine propulsion system having a cathodic protection system, which bushing comprises a generally hollow cylindrical flange portion having a circular periphery of a predetermined diameter, and a generally hollow cylindrical sleeve portion which is coaxial with said flange portion and which has a circular periphery of a diameter which is less than the predetermined diameter, said bushing being formed of a conductive plastic allowing electrical current flow across said bushing to a sacrificial anode.

10. A bushing in accordance with claim 9 wherein said conductive plastic comprises filler material selected from the group carbon, aluminum, or stainless steel.

11. A bushing in accordance with claim 9 having a resistivity less than 100 ohm-centimeters.

12. A bushing for use in a marine propulsion system having an anodic protection system, which bushing comprises a generally hollow cylindrical flange portion having a circular periphery of a predetermined diameter, and a generally hollow cylindrical sleeve portion which is coaxial with said flange portion and which has a circular periphery of a diameter which is less than the predetermined diameter, sid bushing being formed of a conductive plastic to provide an electrical current path across said bushing.

13. A marine propulsion device including a corrosion protection system, a hinge pin, a first electrically conductive component connected to said hinge pin, a second electrically conductive component mounted on said hinge pin for rotation relative to said first electrically conductive component, at least one bushing on said hinge pin separating said first electrically conductive component from said second electrically conductive component, which bushing comprises electrically conductive plastic.

14. A marine propulsion device in accordance with claim 13 wherein said bushing has a resistivity less than 100 ohm-centimeters.

15. A marine propulsion device in accordance with claim 13 wherein said bushing comprises filler material selected from the group carbon, aluminum, or stainless steel.

16. A marine propulsion device in accordance with claim 13 wherein said first electrically conductive component is a hydraulic cylinder and said second electrically conductive component is a gimble ring.

17. A marine propulsion device including a corrosion protection system, a hinge pin, a first electrically conductive component connected to said hinge pin, a second electrically conductive component mounted on said hinge pin for rotation relative to said first electrically conductive component, at least one bushing on said hinge pin separating said first electrically conductive component from said second electrically conductive component, said bushing being comprised of plastic which is at least partially coated or plated with a conductive material to provide a path for current flow across said bushing.

18. A marine propulsion device in accordance with claim 17 wherein said first electrically conductive component is a hydraulic cylinder and said second electrically conductive component is a gimble ring.

19. A marine propulsion device including a corrosion protection system, a hinge pin, a first electrically conductive component connected to said hinge pin, a second electrically conductive component mounted on said hinge pin for rotation relative to said first electrically conductive component, at least one bushing on said hinge pin separating said first electrically conductive component from said second electrically conductive component, said bushing comprising plastic and being electrically conductive.

20. A marine propulsion device in accordance with claim 19 wherein said first electrically conductive component is a hydraulic cylinder and said second electrically conductive component is a gimble ring.

21. A marine propulsion device comprising a propulsion unit adapted to be mounted on a boat for pivotal movement relative thereto about a generally vertical steering axis, said propulsion unit including a propeller shaft adapted to support a propeller and adapted to be driven by an engine, said marine propulsion device further including a corrosion protection system requiring electrical current flow and at least one bushing comprised of plastic which is at least partially coated or plated with a conductive material and which provides a current path for electrically conductive components separated thereby.

22. A marine propulsion device comprising a propulsion unit adapted to be mounted on a boat for pivotal movement relative thereto about a generally vertical steering axis, said propulsion unit including a propeller shaft adapted to support a propeller and adapted to be driven by an engine, said marine propulsion device further including a corrosion protection system requiring electrical current flow and at least one bushing which comprises plastic, which is electrically conductive, and which provides a current path for electrically conductive components separated thereby.

23. A bushing for use in a marine propulsion system having a cathodic protection system, which bushing comprises a generally hollow cylindrical flange portion having a circular periphery of a predetermined diameter, and a generally hollow cylindrical sleeve portion which is coaxial with said flange portion and which has a circular periphery of a diameter which is less than the predetermined diameter, said bushing being formed of plastic, and being electrically conductive to provide a path for current flow across said bushing to a sacrificial anode.

* * * * *